(12) United States Patent
Gareau et al.

(10) Patent No.: US 11,552,722 B2
(45) Date of Patent: Jan. 10, 2023

(54) PRECISION TIME PROTOCOL USING A COHERENT OPTICAL DSP FRAME

(71) Applicant: Ciena Corporation, Hanover, MD (US)

(72) Inventors: Sebastien Gareau, Ottawa (CA); Jeffery Thomas Nichols, Marietta, GA (US); Manoj Verghese, Ottawa (CA); Andrew McCarthy, Ottawa (CA)

(73) Assignee: Ciena Corporation, Hanover, MD (US)

( * ) Notice: Subject to any disclaimer, the term of this patent is extended or adjusted under 35 U.S.C. 154(b) by 49 days.

(21) Appl. No.: 17/117,289

(22) Filed: Dec. 10, 2020

(65) Prior Publication Data
US 2022/0190946 A1    Jun. 16, 2022

(51) Int. Cl.
*H04J 3/06* (2006.01)
*H04J 3/16* (2006.01)
*H04B 10/40* (2013.01)
*G06F 7/58* (2006.01)

(52) U.S. Cl.
CPC ............ *H04J 3/0667* (2013.01); *G06F 7/582* (2013.01); *H04J 3/0697* (2013.01); *H04J 3/1652* (2013.01)

(58) Field of Classification Search
CPC ........ G06F 7/582; H04B 10/40; H04J 3/0667; H04J 3/0697; H04J 3/1652; H04J 3/167; H04Q 2213/199
See application file for complete search history.

(56) References Cited

U.S. PATENT DOCUMENTS

| | | | |
|---|---|---|---|
| RE38,619 E | 10/2004 | Paratore et al. | |
| 6,839,858 B1 | 1/2005 | James et al. | |
| 6,868,092 B1 | 3/2005 | Bell et al. | |
| 7,085,281 B2* | 8/2006 | Thomas | H04Q 11/0067 370/347 |
| 7,181,545 B2 | 2/2007 | Dziawa et al. | |
| 7,835,366 B2 | 11/2010 | Aweya et al. | |
| 8,331,793 B2* | 12/2012 | Takeuchi | H04J 3/1652 398/140 |
| 8,370,704 B2 | 2/2013 | Ganga et al. | |
| 8,594,018 B2 | 11/2013 | Richards et al. | |
| 8,630,315 B2 | 1/2014 | Rivaud et al. | |
| 8,718,471 B2 | 5/2014 | Prakash et al. | |

(Continued)

OTHER PUBLICATIONS

Roberts, et al., "Flexible Transceivers," ECOC Technical Digest, 2012 OSA, pp. 1-3.

(Continued)

*Primary Examiner* — Alpus Hsu
(74) *Attorney, Agent, or Firm* — Clements Bernard Baratta; Lawrence A. Baratta, Jr.; Christopher L. Bernard (57) ABSTRACT

A coherent optical modem includes an optical interface; and circuitry connected to the optical interface and configured to detect a first timing reference point in a transmit Digital Signal Processor (DSP) frame in a transmit direction from a first node to a second node, and detect a second timing reference point in a receive DSP frame in a receive direction from the second node to the first node, wherein the first timing reference point and the second timing reference point are determined based on a pattern in any DSP frame field including i) padding area, ii) a reserved area, and iii) a DSP Multi-Frame Alignment Signal (MFAS) area. The pattern can be input in select DSP frames for a time period that is greater than a time period for each DSP frame.

18 Claims, 5 Drawing Sheets

(56) References Cited

U.S. PATENT DOCUMENTS

| | | | |
|---|---|---|---|
| 8,737,389 | B2 | 5/2014 | Chiesa et al. |
| 8,848,533 | B1 | 9/2014 | Stuart et al. |
| 8,867,913 | B2 | 10/2014 | Gareau et al. |
| 9,432,144 | B2 | 8/2016 | Gareau et al. |
| 10,014,937 | B1* | 7/2018 | Di Mola ............ H04L 63/1416 |
| 10,097,480 | B2 | 10/2018 | Gareau et al. |
| 10,313,103 | B1* | 6/2019 | Perras ................. H04B 10/516 |
| 10,396,972 | B1* | 8/2019 | Gareau .................. H04J 3/065 |
| 10,750,260 | B1* | 8/2020 | Gareau ............. H04Q 11/0066 |
| 2004/0006645 | A1 | 1/2004 | Dziawa et al. |
| 2005/0102419 | A1 | 5/2005 | Popescu et al. |
| 2006/0007943 | A1 | 1/2006 | Fellman |
| 2006/0109805 | A1 | 5/2006 | Malamal Vadakital et al. |
| 2008/0069248 | A1 | 3/2008 | Heise et al. |
| 2009/0297164 | A1 | 12/2009 | Horiuchi |
| 2010/0042883 | A1 | 2/2010 | Heise |
| 2010/0150243 | A1 | 6/2010 | Kure et al. |
| 2010/0238836 | A1 | 9/2010 | Diab et al. |
| 2011/0019681 | A1 | 1/2011 | Gazier et al. |
| 2011/0252265 | A1 | 10/2011 | Iwami et al. |
| 2011/0255546 | A1 | 10/2011 | Pallee et al. |
| 2011/0274149 | A1 | 11/2011 | Xu et al. |
| 2012/0213508 | A1 | 8/2012 | Moynihan |
| 2012/0219005 | A1* | 8/2012 | Durve .................... H04L 47/41 370/400 |
| 2012/0224846 | A1 | 9/2012 | Swanson et al. |
| 2013/0045005 | A1 | 2/2013 | Nakura et al. |
| 2013/0129345 | A1 | 5/2013 | Meng et al. |
| 2013/0136218 | A1 | 5/2013 | Kure et al. |
| 2013/0266312 | A1 | 10/2013 | Prakash et al. |
| 2013/0272143 | A1 | 10/2013 | Schoppmeier |
| 2013/0301634 | A1 | 11/2013 | Ehlers et al. |
| 2013/0308349 | A1 | 11/2013 | Young et al. |
| 2013/0308943 | A1 | 11/2013 | Young et al. |
| 2014/0079409 | A1 | 3/2014 | Ruffini et al. |
| 2014/0093235 | A1 | 4/2014 | Gareau et al. |
| 2014/0177653 | A1 | 6/2014 | Tzeng |
| 2014/0219651 | A1 | 8/2014 | Ruffini et al. |
| 2014/0269778 | A1 | 9/2014 | Yang et al. |
| 2014/0348184 | A1 | 11/2014 | Kure |
| 2015/0055664 | A1 | 2/2015 | Kanonakis et al. |
| 2016/0323164 | A1 | 11/2016 | Cao |
| 2019/0305854 | A1* | 10/2019 | Campos ................. H04B 10/61 |
| 2020/0028585 | A1* | 1/2020 | Abdullah .............. H04L 7/0075 |
| 2020/0153529 | A1* | 5/2020 | Su ........................ H04J 14/0227 |
| 2021/0119894 | A1* | 4/2021 | DeAndrea ........ H04B 10/07955 |

OTHER PUBLICATIONS

Roberts, et al., "100G and Beyond with Digital Coherent Signal Processing," IEEE Communications Magazine, Jul. 2010, pp. 62-69.
Garner, "IEEE 1588 Version 2," ISPCS, Sep. 24, 2008, slides 1-89.
Gho, et al., "Rate-Adaptive Coding for Optical Fiber Transmission Systems," Journal of Lightwave Technology, vol. 29, No. 2, Jan. 15, 2011, pp. 222-233.
ITU-T, Telecommunication Standardization Sector of ITU, "Precision time protocol telecom profile for frequency synchronization," International Telecommunication, Jul. 2014, pp. 1-28.
Jan. 8, 2016 European Search Report for European Patent Application No. EP 15 18 2272.
Gustlin, "FlexEthernet—Protocols and Components," XILINX All Programmable, Oct. 16, 2014.
OIF Optical Internetworking Forum, "FlexE Implementation Agreement—Draft 1.1," Optical Internetworking Forum, Jul. 2015.
ITU, Telecommunication Standardization Sector of ITU, "Architecture of Ethernet layer networks," International Telecommunication Union, Feb. 2004.
Stephen J. Trowbridge, Alcatel-Lucent USA, Mapping, of Flex Ethernet Clients over OTN, International Telecommunication Union, COM 15-C 1213-E, Study Period 2013-2016, vol. 11/15, Jun. 2015, pp. 1-7.
Marteen Vissers, Huawei Technologies Co., Ltd., Considerations on the mapping of FlexE Client and Subrate signals into OTN, International Telecommunication Union, COM 15-C 1195-E, Study Period 2013-2016, vol. 11/15, Jun. 2015, pp. 1-13.
OIF Optical Internetworking Forum, IA OIF-MLG-02.0, Multi-Link Gearbox Implementation Agreement, Apr. 2013, pp. 1-40.
European Search Report Issued in European Application EP 16177286, dated Oct. 21, 2016.
Aug. 6, 2018 European Search Report issued for International Application No. EP18176943.
Li Xueqiao et al., "Implementation and research of hardware time stamping techniques based on IEEE1588," May 27, 2011, pp. 6-9.
Sluyski et al., OIF, Implementation Agreement 400ZR, OIF-400ZR-01.0, Mar. 10, 2020, pp. 1-100.
Sluyski, Open ROADM, Open ROADM MSA 3.01 W-Port Digital Specification (200G-400G), Open ROADM-Draft document, MSA_3.01 W-Port Digital Specification, Jun. 25, 2019, pp. 1-56.
Srivastava et al., Open ZR+ MSA,Technical Specification, version 1.0, Sep. 4, 2020, pp. 1-74.
ITU-T, Telecommunication Standardization Sector of ITU, Flexible OTN long-reach interfaces, G.709.3/Y.1331.3, Jun. 2018, pp. 1-34.
ITU-T, Telecommunication Standardization Sector of ITU, Flexible OTN long-reach interfaces, Amendment 1, G.709.3/Y.1331.3, Nov. 2018, pp. 1-74.

* cited by examiner

PRECISION TIME PROTOCOL USING A COHERENT OPTICAL DSP FRAME

FIELD OF THE DISCLOSURE

The present disclosure generally relates to networking. More particularly, the present disclosure relates to systems and methods for Precision Time Protocol (PTP) using a coherent Digital Signal Processor (DSP) frame.

BACKGROUND OF THE DISCLOSURE

Timing synchronization between nodes in a network is described in various standards such as IEEE 1588-2008 "Standard for a Precision Clock Synchronization Protocol for Networked Measurement and Control Systems," ITU-T G.8265.1/Y.1365.1 (07/14) "Precision time protocol telecom profile for frequency synchronization," ITU-T G.8275.1 "Time and Phase Profile," the contents of each is incorporated by reference herein. The requisite information for the transfer of precise time is (1) a timing reference point, or "significant instant" to which timing information can be related, (2) the timing information itself, and (3) a measure of the delay it takes to transfer the timing information between two nodes. IEEE Standard 1588-2008 for a Precision Clock Synchronization Protocol for Networked Measurement and Control Systems, the contents of which are incorporated by reference herein, is referred to as Precision Time Protocol (PTP) and is used to synchronize clocks throughout the network. IEEE 1588-2008 only defines a protocol for transferring time information over a packet network. It does not address performance aspects such as the time accuracy that can be achieved over a network. In general, PTP supports accuracy in the sub-microsecond range. IEEE 1588 supports PTP over Ethernet, and PTP is described over Optical Transport Network (OTN) in G.709/Y.1331 (06/20), "Interfaces for the optical transport network," the contents of which are incorporated by reference herein. PTP has also been described with reference to Flexible Ethernet, such as in commonly-assigned U.S. Pat. No. 10,673,782, issued Jun. 2, 2020, and entitled "Time transfer systems and methods over Flexible Ethernet," the contents of which are incorporated by reference herein.

These time transfer approaches are protocol-based and do not account for Forward Error Correction (FEC) and DSP mappings in optical networks, causing non-deterministic timing delays. The transfer of time over optical networks can be challenging because of the delays introduced by elastic First-In-First-Out (FIFOs) required in transport mapping schemes such as OTN and enhanced high coding gain soft-decision Forward Error Correction (SD-FEC) schemes. Uncertainty in these delays (at start-up or after fault recovery) results in uncertainty in the transferred time. Also, uncertainty in these delays result in time error between the network nodes. Coherent optical interfaces (enabled by coherent optical modules) are used for a variety of OTN and Ethernet applications. Such interfaces are now standardized in G.709.3/Y.1331.3 (06/18), and G.709.3/Y.1331.3 Amendment 1 (11/18), "Flexible OTN long-reach interfaces," and in OIF Implementation Agreement 400ZR, OIF-400ZR-01.0, Mar. 10, 2020, the contents of each are incorporated by reference herein. Also, IEEE is now also looking at using coherent technology for 400GBASE-ZR and future ZR/LR 800G interfaces. Commonly-assigned U.S. Pat. No. 9,432,144, issued Aug. 30, 2016, and entitled "Precision time transfer systems and methods in optical networks," the contents of which are incorporated by reference herein, describes a solution for incorporating timing reference points in the FEC layer to account for FEC delays.

As well, the adaptation to FEC, digital DSP frames, such as in G.709.3 and 400ZR, add to delay uncertainty. These complex devices often operate with a gapped clock (data valid), resulting in data path jitter and uncertainty. All these uncertainties in these delays (at start-up or after fault recovery) results in uncertainty in the transferred time, which is often referred as constant time error (cTE).

BRIEF SUMMARY OF THE DISCLOSURE

The present disclosure relates to systems and methods for Precision Time Protocol (PTP) using a coherent Digital Signal Processor (DSP) frame. A DSP frame is a time based structure, delineated with periodic training and pilot symbols. The present disclosure presents a solution to run PTP (time transfer) over such optical coherent interfaces, using the DSP training symbols as a point of reference for a PTP timestamp. This provides a solution for timing transfer over coherent modems, such as 400ZR, G.709.3 (FlexO), and the like. This can be referred to as PTP over DSP. The objective of the systems and methods is to mitigate and minimize delay uncertainty and jitter in timing transfer between coherent optical interfaces.

In an embodiment, a coherent optical modem includes an optical interface; and circuitry connected to the optical interface and configured to detect a first timing reference point in a transmit Digital Signal Processor (DSP) frame in a transmit direction from a first node to a second node, and detect a second timing reference point in a receive DSP frame in a receive direction from the second node to the first node, wherein the first timing reference point and the second timing reference point are determined based on a pattern in any DSP frame field including i) a padding area, ii) a reserved area, and iii) a DSP Multi-Frame Alignment Signal (MFAS) area. A time difference between the first node and the second node is determined based in part on the first timing reference point and the second timing reference point and corresponding timing reference points from the second node.

The pattern can be input in select DSP frames for a time period between timing reference points that is greater than a time period for each DSP frame. The pattern can include a plurality of bits. The pattern can include a fixed value. The pattern can include a Pseudorandom Binary Sequence (PRBS). Timing information from the second node can be provided to the first node via a synchronization messaging channel. The coherent optical module can utilize a Flexible Optical Transport Network (FlexO) or an OpenROADM interface. The coherent optical module can utilize a ZR or an OpenZR+ interface. The DSP frame can be compliant to G.709.3 Amendment 1 or OIF Implementation Agreement 400ZR.

In another embodiment, a method IS implemented in a first node including a coherent optical modem in communication with a corresponding coherent optical modem in a second node. The method includes receiving a departure time, $T_{D-A}$, from the second node, wherein the departure time, $T_{D-A}$, is determined by the second node based on detecting a timing reference point in a Digital Signal Processor (DSP) frame; determining an arrival time, $T_{A-B}$, based on detecting the timing reference point in the DSP frame; and determining a time difference between the first node and the second node based in part on the departure time, $T_{D-A}$, and the arrival time, $T_{A-B}$. The timing reference point is determined based on a pattern in any DSP frame field including i) a padding area, ii) a reserved area, and iii) a DSP Multi-Frame Alignment Signal (MFAS) area.

The pattern can be input in select DSP frames for a time period between timing reference points that is greater than a time period for each DSP frame. The pattern can include a plurality of bits. The pattern can include a fixed value. The pattern can include a Pseudorandom Binary Sequence (PRBS). Timing information from the second node can be provided to the first node via a synchronization messaging channel. The coherent optical module can utilize a Flexible Optical Transport Network (FlexO) or an OpenROADM interface. The coherent optical module can utilize a ZR or an OpenZR+ interface. The DSP frame can be compliant to G.709.3 Amendment 1 or OIF Implementation Agreement 400ZR.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Precision Time Protocol (PTP) using a coherent Digital Signal Processor (DSP) frame. The present disclosure presents a solution to run PTP (time transfer) over such optical coherent interfaces, using the DSP training symbols as a point of reference for a PTP timestamp. This provides a solution for timing transfer over coherent modems, such as 400ZR, G.709.3 (FlexO), and the like. This can be referred to as PTP over DSP. The objective of the systems and methods is to mitigate and minimize delay uncertainty and jitter in timing transfer between coherent optical interfaces.

Network

Figure 1:
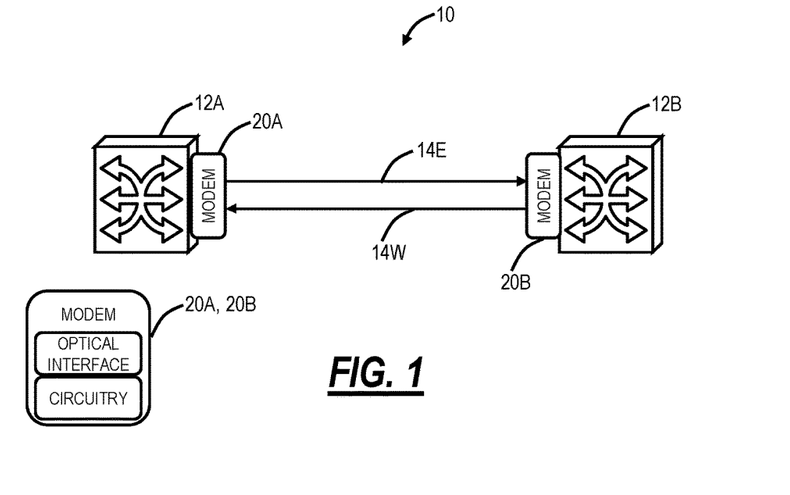
FIG. 1 is a network diagram of an optical network between two nodes connected by optical modems.

FIG. 1 is a network diagram of an optical network 10 between two nodes 12A, 12B. The nodes 12A, 12B are interconnected by links 14E, 14W providing bidirectional communication. The links 14E, 14W are optical fibers and the nodes 12A, 12B can be network elements, and the nodes 12A, 12B can each include a coherent optical modem 20A, 20B. The nodes 12A, 12B can be switches, routers, Wavelength Division Multiplexing (WDM) terminals, Reconfigurable Optical Add/Drop Multiplexers (ROADMs), and the like. The coherent optical modems 20A, 20B are connected to one another via the links 14E, 14W and can include optical transceivers, transponders, transmitters/receivers, etc. The coherent optical modem 20A, 20B can be pluggable modules such as defined by various Multisource Agreements (MSAs), e.g., QSFP variants, CFP variants, etc. The coherent optical modem 20A, 20B can also be 400ZR, G.709.3, and the like. The coherent optical modem 20A, 20B can support OTN (FlexO), Ethernet, and the like.

The nodes 12A, 12B each have an associated clock tracking time, and an objective of the time transfer systems and methods is to convey the time of the node 12A to the node 12B such that the node 12B can synchronize its clock to the clock of the node 12A, or vice versa. The present disclosure contemplates using the DSP layer of the coherent optical modems 20A, 20B for conveying the significant time instant as well as the use of PTP. Note, the optical network 10 is presented for illustration purposes to describe the time transfer systems and methods. Practical embodiments contemplate additional nodes in various interconnection architectures. Further, the time transfer systems and methods, while illustrated between the two nodes 12A, 12B, can be implemented through any size network by selecting a first node, and propagating it's time to all of the other nodes with the time transfer systems and methods described herein.

Coherent Modem Functionality

Figure 2:
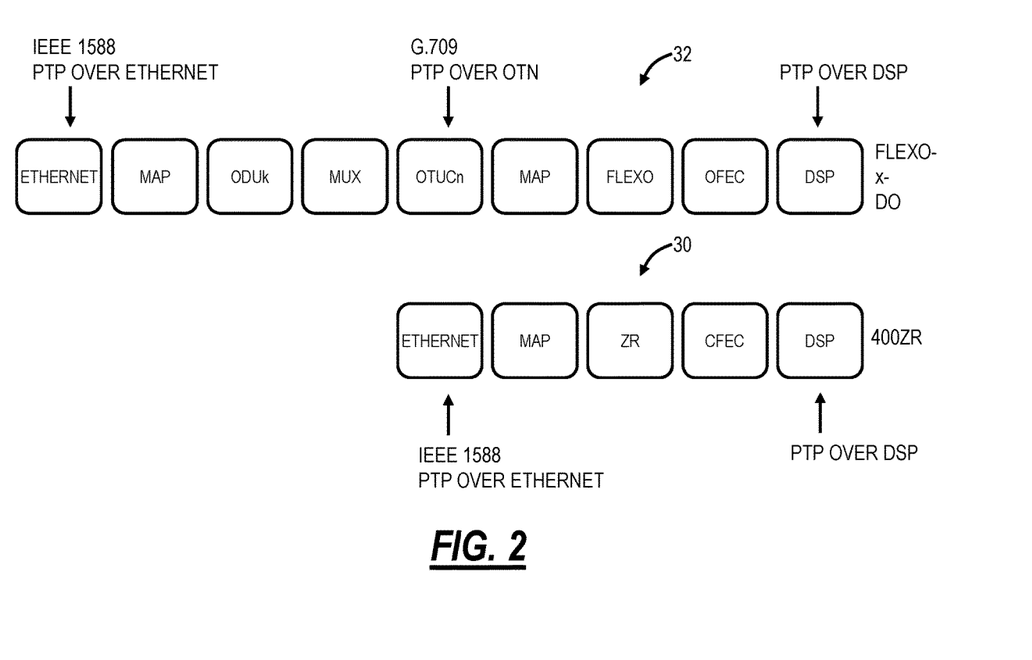
FIG. 2 is a block diagram of functional blocks for an Ethernet (ZR) and OTN (FlexO) coherent interface.

FIG. 2 is a block diagram of functional blocks for an Ethernet (ZR) 30 and OTN (FlexO) 32 coherent interface. The ZR 30 and the FlexO 32 coherent interfaces can be realized in the coherent optical modems 20. As described herein, the ZR 30 interface can be compliant to OIF-400ZR-01.0 or other ZR-related MSAs, such as OpenZR+ and future 800ZR/800LR. OpenZR+ is described in the OpenZR+ Specifications, version 1.0, 4 Sep. 2020, the contents of which are incorporated by reference.

The FlexO 32 interface can be compliant to G.709.3 and the like, i.e., a FlexO-x-DO, which is a FlexO interface signal of order x with strong OFEC implementation. FIG. 2 illustrates functional blocks that include framing and other data manipulation and can be implemented in circuitry.

The ZR 30 interface includes an Ethernet block, a mapping block, a ZR block, a Concatenated FEC (CFEC) block, and a DSP block. These blocks start with the Ethernet block, which interfaces an Ethernet signal, and ends after the DSP block, which provides a signal for optical transmission. The FlexO 32 interface includes an Ethernet block, a mapping block, an Optical Data Unit level k (ODUk) block, a multiplexing block, an Optical Transport Unit C level n (OTUCn) block, a mapping block, a FlexO block, an Open FEC (OFEC) block, and a DSP block. Similar to the ZR 30, the FlexO 32 interface starts with the Ethernet block and maps to a FlexO signal. Note, some implementations may not include all of the mapping or multiplexing blocks. Also, the various functional blocks, while illustrated separately, can be realized in integrated hardware. Note, the modems 20A, 20B can include various additional functionality, which is omitted for illustration purposes.

Conventional IEEE 1588 PTP over Ethernet is performed at the Ethernet block. For the FlexO 32 interface, conventional G.709 PTP over OTN is performed at the OTU block. The problem with PTP over Ethernet and PTP over OTN is there are non-deterministic delays in the FEC and DSP blocks, i.e., delay uncertainty.

The OFEC block is configured to receive a FlexO signal and encode the OTN signal with Soft Decision (SD) FEC (SD-FEC) and to perform SD-FEC decoding to provide an error-corrected signal to the FlexO block. U.S. Pat. No. 9,432,144 describes PTP in the FEC layer to account for the delay uncertainty at the FEC layer. Also, OFEC is described in the Open ROADM MSA 3.01 W-Port Digital Specification, Jul. 25, 2019, the contents of which are incorporated by reference.

The modems 20A, 20B are coherent optical modems with Digital Signal Processing (DSP) therein. The modems 20A, 20B can support programmable modulation, or constellations with both varying phase and/or amplitude. The modems 20A, 20B can support multiple coherent modulation formats such as, for example, i) dual-channel, dual-polarization (DP) binary phase-shift keying (BPSK) for 100G at submarine distances, ii) DP quadrature phase-shift keying (QPSK) for 100G at ultra-long haul distances, iii) 16-quadrature amplitude modulation (QAM) for 200G at metro to regional (600 km) distances), or iv) dual-channel 16QAM for 400G at metro to regional distances. With associated DSP blocks in the modem 20A, 20B hardware, moving from modulation formats can be software-programmable. Also, the modems 20A, 20B can support dual-polarization, such as Polarization Multiplexing. Additionally, the modem 20A, 20B can support various aspects of nonlinear effect mitigation and dispersion compensation (both for chromatic and polarization mode) in the electrical domain, thus eliminating external dispersion compensation devices, filters, etc. Modems can also adapt the FEC coding that is used, as another method to trade-off service rate vs. noise tolerance. Note, based on this functionality, there are associated timing uncertainties added, and the precision time transfer systems and methods eliminate the timing uncertainties.

PTP Over DSP

The DSP and FEC blocks introduce variable delay, such as at start-up, after a fault recovery, etc., and this underterministic delay adds timing uncertainty. To address and compensate for this timing uncertainty, the present disclosure includes using a significant instant, i.e., timing reference point, in the DSP layer. This timing reference point is a first point seen at a receive side and a last point seen at a transmit side and is not affected by any delays in the FEC block or the DSP block.

The present disclosure involves using fixed DSP symbols (sequences) as the timing reference point. The reference point must be reliably detected at given intervals. The time of detection is triggered by the timing reference point or "significant instant." This reference point using the fixed DSP symbol is post FEC processing in the transmit direction and pre FEC processing in the receive direction to minimize the uncertainty and jitter introduced by such blocks. The timing reference point is used to indicate an Arrival Time ($T_a$ using Rx frame boundaries) and Departure Time ($T_d$ using Tx frame boundaries).

The period between the timing reference points must allow for the transfer of the timing information via a synchronization (sync) message channel. That is, there is a requirement to exchange the timing reference points from one node 12A to the other node 12B. The exchange of the timing information can be via PTP sync messages. The sync messaging channel can use the existing protocol layers (e.g., OTN Synchronization Message Channel (OSMC) in OTN, Ethernet Synchronization Message Channel (ESMC) in Ethernet, a Data Communication Network (DCN), an Optical Service Channel (OSC), etc.).

Figure 3:
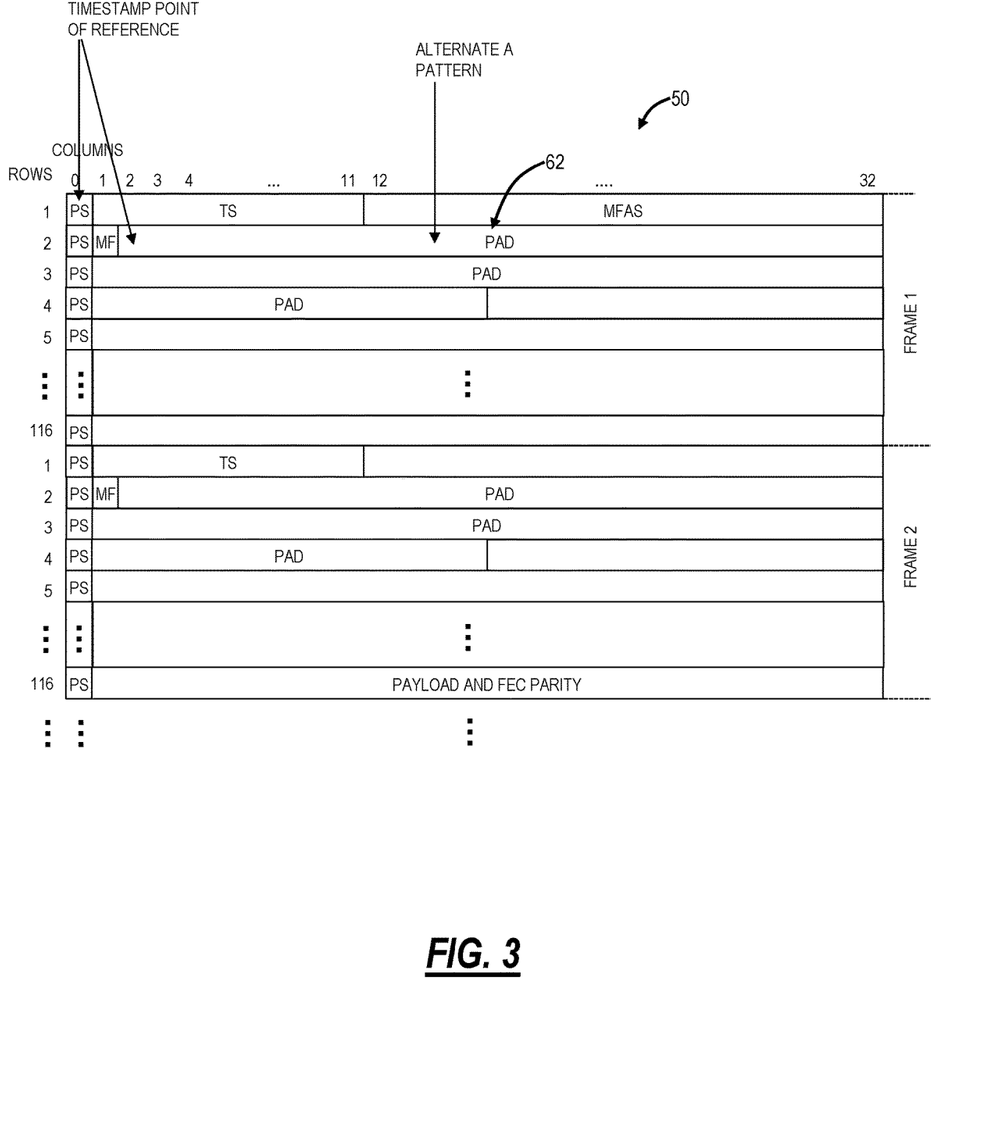
FIG. 3 is a block diagram of a DSP frame.
Figure 4:
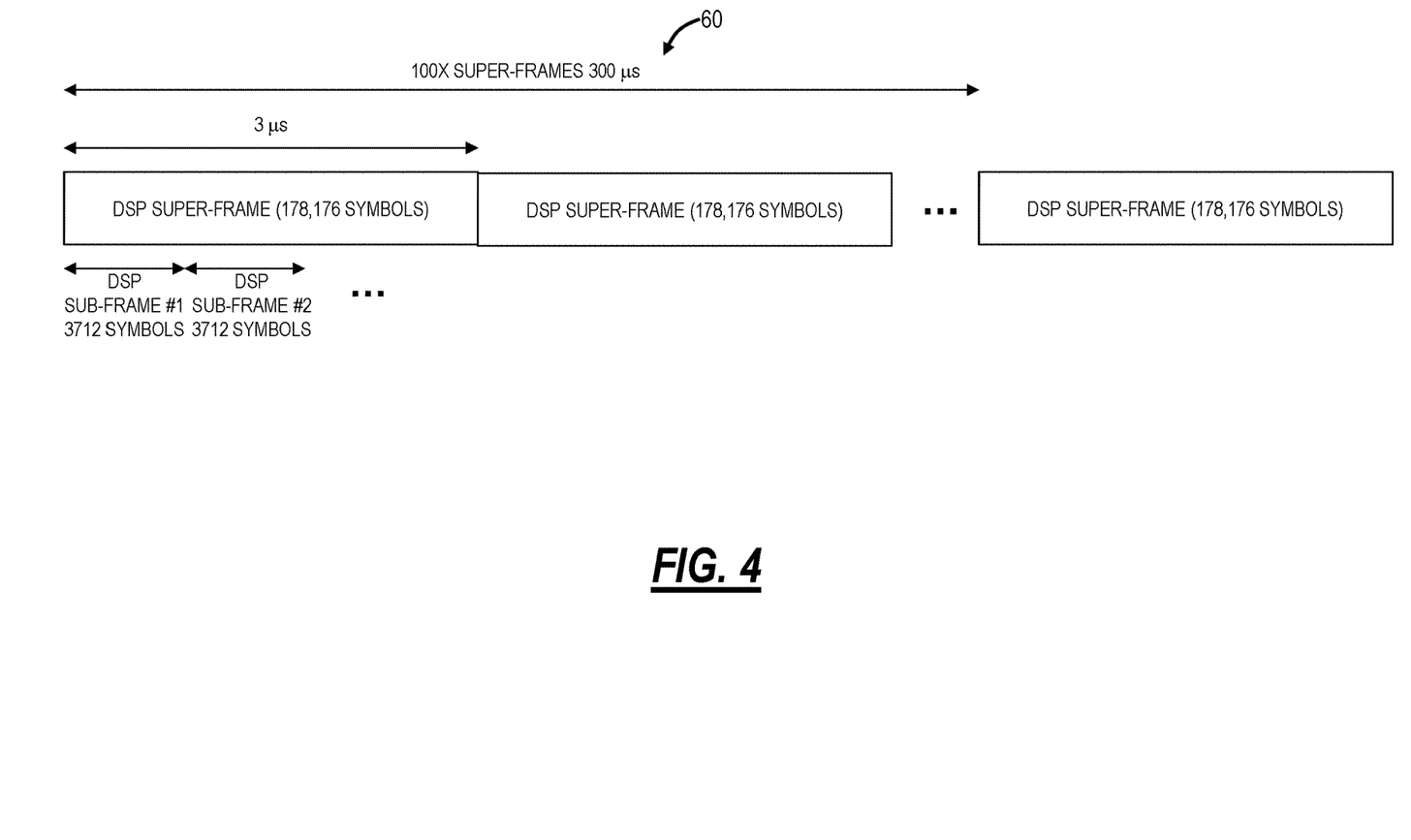
FIG. 4 is a block diagram of DSP super-frames.

FIG. 3 is a block diagram of a DSP frame 50, and FIG. 4 is a block diagram of DSP super-frames 60. As described herein, a DSP frame is a structure of symbols that is used to modulate/demodulate data to a transmitter/from a receiver, i.e., a coherent optical modem. The present disclosure utilizes the term "DSP frame" because it is the data sent to the transmitter and received from the receiver. The DSP frame has been standardized, for example, in FIG. 15.1 from G.709.3/Y.1331.3 Amendment 1 (11/18) as well as in FIG. 8 of the OIF 400ZR IA 1.0. Of course, other embodiments of a DSP frame are also contemplated including proprietary implementations and future standardized versions. Generally, the DSP frame includes symbols for training and pilot, padding/reserved sections, data payload, etc. A key aspect of the DSP frame is it is processed pre FEC so it is not possible to simply include a single bit or just a couple bits for a timestamp as this may be missed.

A DSP frame 50 has a fast period that is too fast to convey timing (i.e., ~3 µs). The present disclosure creates a timestamp event that is a multiple of DSP frames, using the unused DSP frame padding. FIG. 3 is FIG. 15.1 from G.709.3/Y.1331.3 Amendment 1 (11/18) and includes a 76 Z-bit padding field (PAD) in frame 1, row 2 columns 3 to 32, row 3 columns 2 to 32 and row 4 columns 2 to 16. The PAD can also be called reserved (RES) in OpenROADM. FIG. 4 utilizes a DSP super-frame 60 from FIG. 25 of the OpenROADM MSA 3.01 and includes 74 additional symbols are reserved for future use/innovation.

For a timestamp point of reference, alternating fixed patterns (appropriately balanced with 0s and 1s) can be inserted in this PAD or RES area, and when a new pattern is detected, the timestamp (TS) (or alternatively any known location in the frame such as the start of padding location) of the current frame is identified as a timestamp point of reference. Alternatively, alternating Pseudorandom Binary Sequence (PRBS) patterns can be used in the padding area to signal events when the pattern is changing.

These padding (or reserved) fields are processed pre-FEC and must work under large Bit Error Rate (BER) rates, hence a multi-bit pattern is desired for such operation (i.e., it is not possible to use a single bit). The use of multiple bits is such that it is possible to match the pattern with high BER rates. That is, it may not be necessary to perform an exact match, but rather a match of a portion of the bits in the pattern. For example, the threshold of matching the pattern can be based on the bit error rate.

Time Transfer Process

Figure 5:
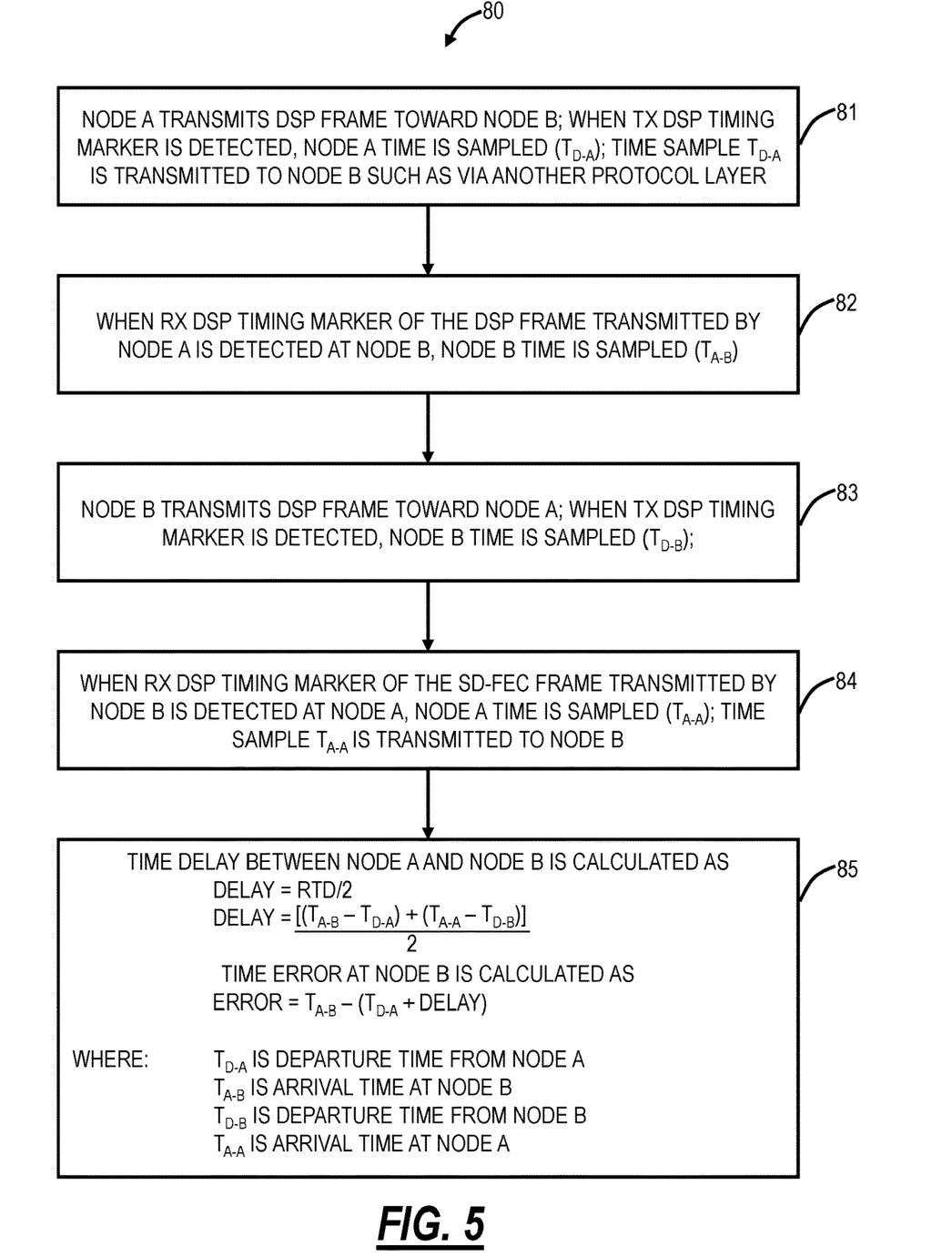
FIG. 5 is a flowchart of a time transfer process implemented between the nodes via the coherent optical modems.

FIG. 5 is a flowchart of a time transfer process 80 implemented between the nodes 12A, 12B via the coherent optical modems 20A, 20B. The time transfer process 80 contemplates operation through the nodes 12A, 12B, the modems 20A, 20B, etc. In some embodiments, more or fewer steps could be included in the precision time transfer process 80. A key aspect of the time transfer process 80 is to convey timing references between the nodes 12A, 12B via markers in the DSP frame, before any FEC decoding and after any FEC encoding, and independent of any delay in the DSP framing process. That is, the time transfer process 80 defines a timing reference point at the DSP frame (previously only defined for higher layer protocols such as the Ethernet layer and the OTN layer) to minimize the effects of the FEC processing and/or adaptation on precision of the transferred timing information. In this manner, the conveyed timing references are not impacted by any delays associated with the adaptation processes, the FEC block, the DSP block, etc.

For illustration purposes, the time transfer process 80 is described with reference to the nodes 12A, 12B in the optical network 10. Here, the objective is to synchronize a clock for the node 12B with a clock of the node 12A. Also, with the appropriate time references captured, through the DSP frame, and transferred to the nodes 12A, 12B, time transfer between the nodes 12A, 12B can be achieved using well-known techniques in other protocols. That is, transferring the time references from the node 12A to the node 12B can be via a separate protocol layer, such as Ethernet packets, a Data Communication Network (DCN), an Optical Service Channel (OSC), OSMC, ESMC, etc.

The precision time transfer process 80 involves using a pattern in the DSP frame (as seen in the padding section of FIG. 3) as a reference for timestamp generation. The pattern can be at given intervals in the select DSP frames. The time of detection becomes the time reference point or "significant instant." Again, this reference point is post protocol mapping and FEC adaptation in the TX direction and pre protocol mapping and FEC processing in the RX direction to minimize the uncertainty and jitter introduced by the FEC processing, protocol mapping, DSP processing, etc.

The precision time transfer process 70 includes the node 12A transmitting a DSP frame towards the node 12B. When a TX DSP timing marker is detected, the node 12A time is sampled ($T_{D\text{-}A}$) and this time sample $T_{D\text{-}A}$ is transferred to the node 12B, such as via another protocol layer (step 81). When the RX DSP timing marker of the DSP frame transmitted by the node 12A is detected at the node 12B, the node 12B time is sampled ($T_{A\text{-}B}$) (step 82). The node 12B transmits a DSP frame towards the node 12A, and when the TX DSP timing marker is detected, the node 12B time is sampled ($T_{D\text{-}B}$) (step 83). When the RX DSP timing marker of the frame transmitted by the node 12B is detected at the node 12A, the node 12A time is sampled ($T_{A\text{-}A}$). This time sample $T_{A\text{-}A}$ is transferred to the node 12B such as via another protocol layer (step 84).

At this point, all four time samples are available at the node 12B. The time delay between the node 12A and the node 12B can be calculated as, assuming the time delays between the nodes 12A, 12B in both directions are symmetric:

$$\text{Round\_Trip\_Delay} = [(T_{A-B} - T_{D-A}) + (T_{A-A} - T_{D-B})]$$

$$\text{Delay} = \frac{\text{Round\_Trip\_Delay}}{2}$$

where: $T_{D\text{-}A}$ is departure time from the node 12A, $T_{A\text{-}B}$ is arrival time at the node 12B, $T_{D\text{-}B}$ is departure time from the node 12B, and $T_{A\text{-}A}$ is arrival time at the node 12A.

The time error at the node 12B can be calculated as:

$$\text{Error} = T_{A-B} - (T_{D-A} + \text{Delay})$$

The clock at the node 12B can be adjusted by the Error thereby synchronizing with the clock at the node 12A. Control algorithms can then be employed to minimize the time error.

The example in FIG. 4 shows the PAD/RES pattern included every 100× time resulting in a time period of 300 μs. Of course, other values are contemplated depending on how many packet per second profile is needed.

Figure 6:
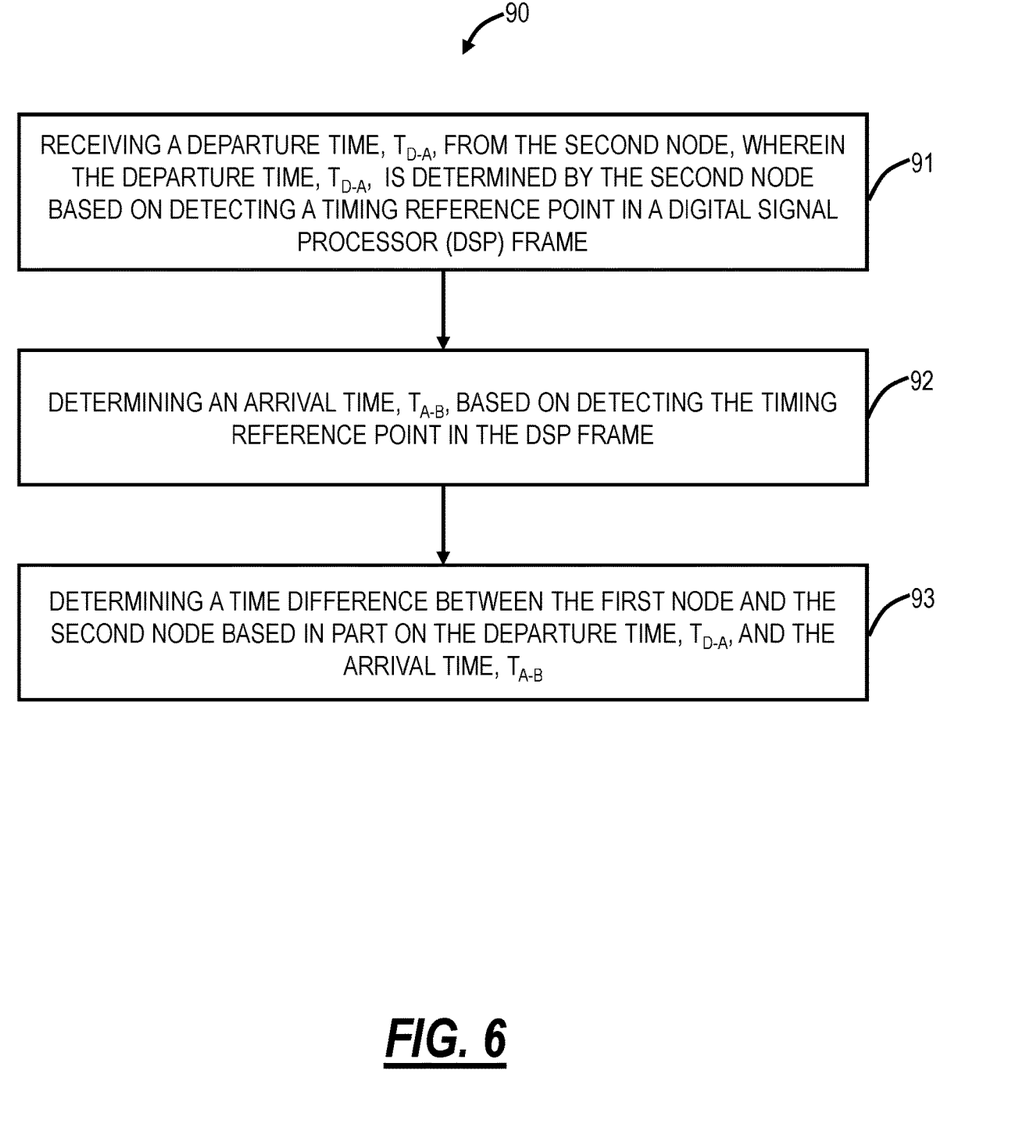
FIG. 6 is a flowchart of a process implemented by a coherent optical modem.

FIG. 6 is a flowchart of a process 90 implemented by a coherent optical modem. That is, the process 90 contemplates operation by one of the coherent optical modems 20A, 20B. The process 90 is implemented in a first node 12B including a coherent optical modem 20B in communication with a corresponding coherent optical modem 20A in a second node 12A.

The process 90 includes receiving a departure time, $T_{D\text{-}A}$, from the second node, wherein the departure time, $T_{D\text{-}A}$, is determined by the second node based on detecting a timing reference point in a Digital Signal Processor (DSP) frame (step 91); determining an arrival time, $T_{A\text{-}B}$, based on detecting the timing reference point in the DSP frame (step 92); and determining a time difference between the first node and the second node based in part on the departure time, $T_{D\text{-}A}$, and the arrival time, $T_{A\text{-}B}$ (step 93).

The coherent optical modems 20A, 20B can include an optical interface and circuitry connected to the optical interface and configured to implement the process 90, see FIG. 1.

The timing reference point can be determined based on a pattern in the padding area or reserved area in the DSP frame. The timing reference point can be determined based on a pattern in any DSP frame field including i) a padding area, ii) a reserved area, and iii) a DSP Multi-Frame Alignment Signal (MFAS) area.

The pattern can be input in select DSP frames for a time period between timing reference points that is greater than a time period for each DSP frame. The pattern can include a plurality of bits. The pattern can include a fixed pattern. The pattern can include a Pseudorandom Binary Sequence (PRBS).

Timing information from the second node can be provided to the first node via a synchronization messaging channel. The coherent optical module can utilize a Flexible Optical Transport Network (FlexO) interface or a ZR interface. The DSP frame can be compliant to G.709.3 Amendment 1.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A coherent optical modem in a first node, the coherent optical modem comprising:
an optical interface; and
circuitry connected to the optical interface and configured to
detect a first timing reference point in a transmit Digital Signal Processor (DSP) frame in a transmit direction from the first node to a second node, and
detect a second timing reference point in a receive DSP frame in a receive direction from the second node to the first node,
wherein the second timing reference point is determined based on a pattern in the received DSP frame that includes multiple bits that are processed prior to Forward Error Correction (FEC), in any DSP frame field including i) a padding area, ii) a reserved area, and iii) a DSP Multi-Frame Alignment Signal (MFAS) area.

2. The coherent optical modem of claim 1, wherein a time difference between the first node and the second node is determined based in part on the first timing reference point and the second timing reference point and corresponding timing reference points from the second node.

3. The coherent optical modem of claim 1, wherein the pattern is input in select DSP frames for a time period between timing reference points that is greater than a time period for each DSP frame.

4. The coherent optical modem of claim 1, wherein the pattern includes a fixed value.

5. The coherent optical modem of claim 1, wherein the pattern includes a Pseudorandom Binary Sequence (PRBS).

6. The coherent optical modem of claim 1, wherein timing information from the second node is provided to the first node via a synchronization messaging channel.

7. The coherent optical modem of claim 1, wherein the coherent optical modem utilizes a Flexible Optical Transport Network (FlexO) or an Open Reconfigurable Optical Add/Drop Multiplexer (OpenROADM) interface.

8. The coherent optical modem of claim 1, wherein the coherent optical modem utilizes a ZR, as defined in the Optical Internetworking Forum (OIF) Implementation Agreement 400ZR, OIF-400ZR-01.0, Mar. 10, 2020, or an OpenZR+ interface, as defined in OpenZR+ Specification, version 1.0, Sep. 4, 2020.

9. The coherent optical modem of claim 1, wherein the DSP frame is compliant to G.709.3 Amendment 1 or Optical Internetworking Forum (OIF) Implementation Agreement 400ZR.

10. A method implemented in a first node including a coherent optical modem in communication with a corresponding coherent optical modem in a second node, the method comprising:
receiving a departure time, $T_{D-A}$, from the second node, wherein the departure time, $T_{D-A}$, is determined by the second node based on detecting a timing reference point in a Digital Signal Processor (DSP) frame;
determining an arrival time, $T_{A-B}$, based on detecting the timing reference point in the DSP frame that includes a pattern of multiple bits in any DSP frame field processed prior to Forward Error Correction (FEC); and
determining a time difference between the first node and the second node based in part on the departure time, $T_{D-A}$, and the arrival time, $T_{A-B}$.

11. The method of claim 10, wherein the any DSP frame field includes any of i) a padding area, ii) a reserved area, and iii) a DSP Multi-Frame Alignment Signal (MFAS) area.

12. The method of claim 11, wherein the pattern is input in select DSP frames for a time period between timing reference points that is greater than a time period for each DSP frame.

13. The method of claim 11, wherein the pattern includes a fixed value.

14. The method of claim 11, wherein the pattern includes a Pseudorandom Binary Sequence (PRBS).

15. The method of claim 10, wherein timing information from the second node is provided to the first node via a synchronization messaging channel.

16. The method of claim 10, wherein the coherent optical modem utilizes a Flexible Optical Transport Network (FlexO) or an Open Reconfigurable Optical Add/Drop Multiplexer (OpenROADM) interface.

17. The method of claim 10, wherein the coherent optical modem utilizes a ZR, as defined in the Optical Internetworking Forum (OIF) Implementation Agreement 400ZR, OIF-400ZR-01.0, Mar. 10, 2020, or an OpenZR+ interface, as defined in OpenZR+ Specification, version 1.0, Sep. 4, 2020.

18. The method of claim 10, wherein the DSP frame is compliant to G.709.3 Amendment 1 or Optical Internetworking Forum (OIF) Implementation Agreement 400ZR.

* * * * *